United States Patent Office 3,485,278
Patented Dec. 23, 1969

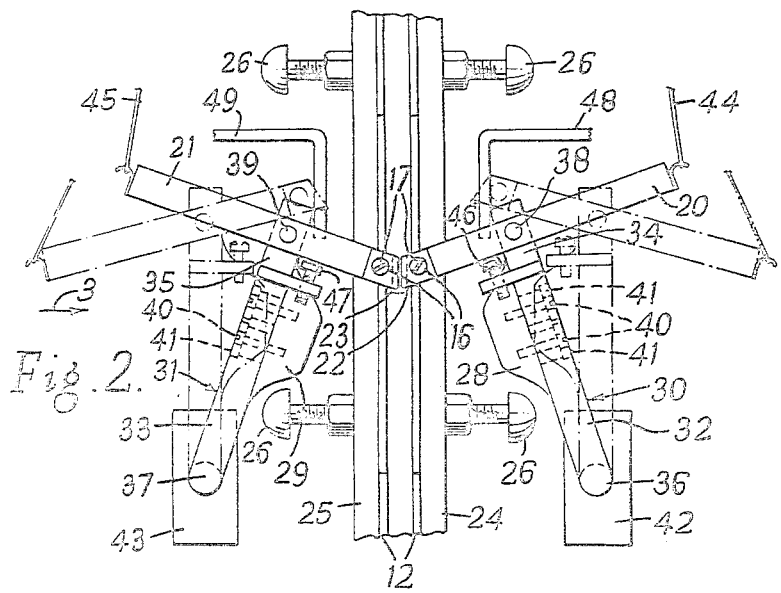
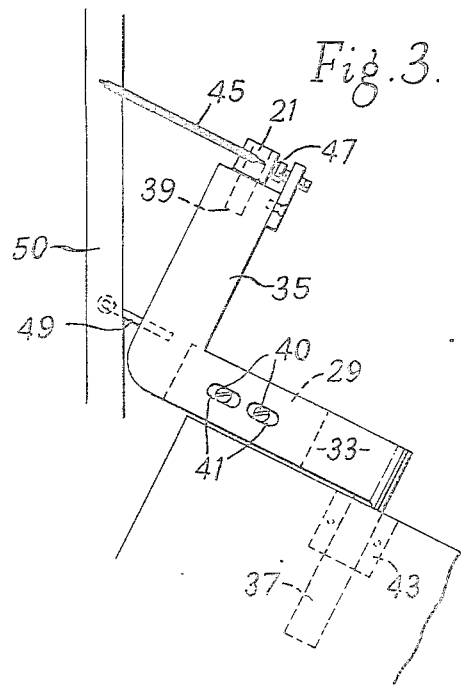

3,485,278
TREATMENT OF ONIONS
Leslie A. Parsons, Burry Port, Wales, assignor to
Leslie A. Parsons & Sons Limited
Filed Nov. 9, 1966, Ser. No. 593,046
Claims priority, application Great Britain, July 4, 1966,
29,916/66
Int. Cl. A23n 7/00; B26d 1/10
U.S. Cl. 146—43    5 Claims

ABSTRACT OF THE DISCLOSURE

A thin slit is made in onions from end to end by means of a pair of movably mounted knives that first engage the middle of the onion and then move apart from each other toward the ends of the onion as the onion moves past them. The knives are resiliently urged toward the onion and are moved apart in synchronism with a conveyor that carries the onion between them.

---

This invention relates to an apparatus for slitting the skins and/or inedible layers of onions or root and fruit crops and is more especially intended for onions. This slitting facilitates subsequent removal of the skins and unwanted layers from the onions.

For convenience of description the term "onion" used herein is intended to include other similar articles of root and fruit crops.

According to the invention there is provided apparatus for slitting the skins and/or inedible layers of onions comprising means for conveying onions successively through a slitting position, a pair of movably mounted knife carrier members, resilient means to urge said members to a position where the knives are adjacent each other where they will be engaged by the middle of the moving onion and will be pressed back by the onion, and means for moving said members apart so that the knives slit the onion skin from the middle to the ends thereof.

The invention will now be described, by way of example, with reference to the accompanying drawings, wherein:

FIGURE 2 is a plan view of the knife mechanism according to the invention;

FIGURE 3 is a view of the knife mechanism in the direction of the arrow 3 on FIGURE 2.

Figure 1:
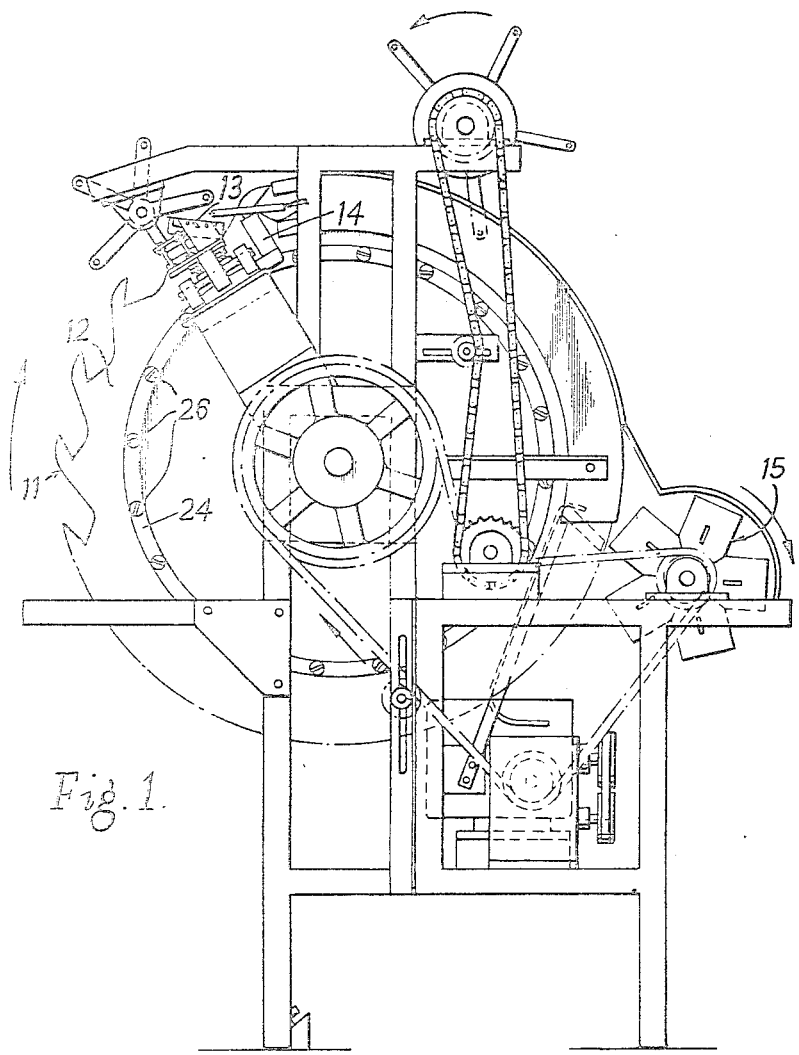
FIGURE 1 is a side elevation of a machine for skinning onions made in accordance with the invention.

Referring more particularly to FIGURE 1, the machine comprises an onion carrier 11, comprising a pair of substantially circular notched plates 12 spaced apart from each other and rotatable by a drive means about a horizontal shaft. The apices of the notches are arranged to lie on a common circle (pitch circle). Two topping and tailing knife devices 13 are arranged either side of the onion carrier 11. The skin slitting mechanism made in accordance with the invention is shown in FIGURE 1 at 14 and an air blast skin removing apparatus is shown at 15.

Each onion is arranged transversely of the onion carrying notches so that its body lies between the plates 12 and after each onion has been topped and tailed by the knife devices 13, it is carried by the onion carrier 11 into the path of the knife mechanism 14.

Figure 4:
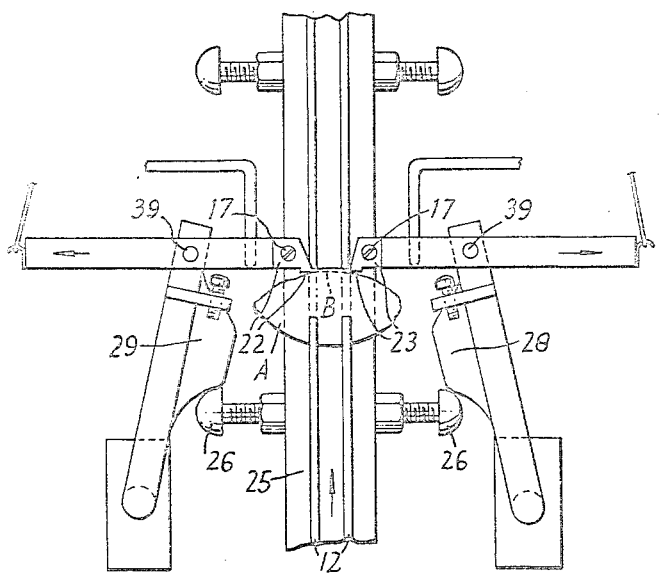
FIGURE 4 is a view similar to FIGURE 2 but showing the position of the parts halfway through the slitting operation.

The knife mechanism 14 includes two arms 20, 21 carrying knives 22, 23 respectively supported on either side of the notched plates 12 so that they move reciprocally into and out of the path of the onion carrying notches. The arms are so aligned that the knives 22, 23 are on the pitch circle of the onion carrier 11, or alternatively they may be aligned above or below the pitch circle depending on the type of longitudinal slit desired. Each arm may have more than one knife e.g. two spaced fifteen thousandths of an inch apart. The knives 22, 23 which are clamped by means of screws 16 and plates 17 to the end of each arm may project from the arm by any desired distance, e.g. between seven and fifteen thousandths of an inch. As can be seen in FIGURE 4, when an onion A engages the arms 20, 21, the knives 22, 23 cut a slit B in the skins and/or inedible layers thereof in a longitudinal direction from the centre outwards whilst at the same time the arms 20, 21 themselves are moved outwards to avoid contact with the notches of the onion carrier 11.

One embodiment of an actuating mechanism for moving the arms 20, 21 out of the path of the notches of the onion carrier 11 includes two identical rings 24, 25 of square or rectangular cross-section and made from for example, metal or plastics. Said rings 24, 25 are attached by, for example, screws to the outside of each notched plate 12 so as to be coaxial therewith. Each ring 24, 25 has an outside diameter which is less than that of the pitch circle of the onion carrier 11, e.g. by four inches. On each ring 24, 25 there is provided, for example, twenty round headed studs 26, i.e. one per pair of notches, projecting outwards at right angles from each ring. The studs 26 are spaced equidistant from each other and each lies on a radial line extending midway between the wide open ends of adjacent notches. When the onion carrier 11 rotates, the studs successively engage upon two cams 28, 29 attached to two support member 30, 31 which are supported in bearings, arranged on either side of the onion carrier 11, so as to be pivotally movable towards and away from the onion carrier 11.

Each support member 30, 31 which is of L-shape has laterally extending limbs 32, 33 and upright limbs 34, 35 respectively. To the free end of each laterally extending limb 32, 33, spindles 36, 37 are attached, e.g. by welding, so as to extend at right angles thereto. The arms 20, 21 are attached to the tops of the upright limbs 34, 35 respectively so as to be rotatable about their own means of attachment 38, 39, e.g. studs or screws. The cams 28, 29 are attached to their respective laterally extending limbs 32, 33 by screws 40. In order to be able to adjust the relative position of each cam 28, 29 along its respective limb 32, 33 slots 41 are provided in the limbs 32, 33. The screws 40 pass through the slots 41. The length of the upright members 34, 35 is such that when the spindles 36, 37 are mounted in their respective bearing blocks 42, 43, the knives 22, 23 lie on the pitch circle of the onion carrier 11 and the cams 28, 29 are in line with studs 26.

The bearing blocks 42, 43 e.g. made from a resin bonded laminated material such as Tufnol, Reg. Trade Mark, are attached to the frame or a fixed part of the machine 10 and the support members 30, 31 are positioned so that the laterally extending limbs 32, 33 point in the direction of rotation of the onion carrier 11 and the knives 22, 23 lie on the pitch circle thereof. The arms are arranged so that the knives 22, 23 face towards the oncoming onions i.e. so that they bear against the skin of each onion.

In operation the knives 22, 23 are moved in a plane coincident with or parallel to a tangent drawn to the pitch circle at the point of contact of the knives with the onion. In order to ensure that the knife or knives in each arm can exert a cutting force on the skin of the onion, a resilient tensioning means e.g. a spring or elastic band 44, 45 is attached between the free end of each arm 20, 21 and a fixed part of the machine e.g. frame member 50 (FIG. 3), which urges the arm in a direction towards the apex of the onion carrying notches and this allows the device to compensate for the variation in the sizes of onions. To limit the movement of each arm towards the apex of the notches, adjustable stops 46, 47 are provided carried on brackets attached to the free ends of the upright limbs 34, 35. The front of the arms bear against these stops, at a point between the pivots 38, 39 and their respective knives 22, 23. By adjusting of each stop 46, 47, the correct angle of the cutting arms can be set, i.e. when the arms are in an operative position they form a letter V the apex of which has an angle of between 130°–175° e.g. 145°. The tensioning means 44, 45 may also serve a second function which is to urge the arms 32, 33 towards each other after they have been forced apart by the cams 28, 29 being engaged by the studs 26 as the plates 12 rotate. L-shaped adjustable stops 48, 49 are provided on each side of the machine to ensure that the support members 30, 31 do not abut the rotatable plates 12.

One limb of each stop 48, 49 is threaded and passes through a hole provided on the frame of the machine, and the other limb of each stop is arranged to project, substantially horizontally, in the space between each upright limb 34, 35 and the rotating plates. The relative position of each stop 48, 49 is set by means of locking nuts provided on the threaded portion so that the arms 20, 21 are permitted to assume their desired positions of just touching each other and at the same time the support members cannot abut against the rotatable plates 12.

As the onion carrier 11 rotates each onion is pressed against the knives 22, 23 and as the carrier 11 continues to rotate the knives 22, 23 are caused to pass over the skins whilst at the same time cutting them longitudinally from the middle out by the arms 20, 21 being pushed back by the moving onion and so increasing the tension of the tensioning means 44, 45. Shortly after the knives 22, 23 are engaged by the onion, the studs 26 engage upon the cams 28, 29 to urge the arms 20, 21 away from the notches of the onion carrier 11, i.e. by pivoting each support member outwards in its bearing, and thereby the knives are drawn along the onion cutting it from end to end. The studs 26 then move the arms 20, 21 together with their respective knives clear of the plates 12 of the onion carrier. As the rotation of the plates 12 continues the studs ride along the return surfaces of the cams 28, 29 which permits the arms 20, 21 to move towards each other under the influence of their respective tensioning means 44, 45 until each support member 30, 31 bears against its respective adjustable L-shaped stop 48, 49.

Several adjustments may be made to the slitting mechanism in order to obtain the desired performance in the slitting of the onions. These include the mentioned adjustable stops 46, 47 for the arms 20, 21, and the adjustable L-shaped stops 48, 49 for limiting the movement of the support members 30, 31 and thereby the movement of the arms 20, 21 towards each other. The number of cutting knives may be varied and the depth of cut may be adjusted. The positions of the cams 28, 29 are made adjustable along each laterally extending limb 32, 33 and if necessary may be readily replaced by cams of the same profile, if the fomer cams become worn, or of different profile to be consistent with any changes made in the shape and size of the onion carrying notches. The studs 26 can be threaded so that their depth of projection from the ring may be varied.

I claim:

1. Apparatus for slitting the skins and/or inedible layers of onions comprising conveying means for conveying onions successively through a slitting position, a pair of movably mounted knife carrier members, resilient means to urge said members to a position where the knives are adjacent each other where they will be engaged by the middle of the moving onion and will be pressed back by the onion, and means moving in synchronism with said conveying means for moving said members apart so that the knives slit the onion skin from the middle to the ends thereof.

2. Apparatus as claimed in claim 1 comprising a frame, two support members pivotally mounted on said frame on either side of said onion conveying means, said onion conveying means having a plurality of onion carrying notches, two arms constituting said knife carrier members pivotally mounted on said support members so as to be movable towards and away from the line of movement of said notches, said resilient means being in the form of two tensioning means each connected between the other end of an arm and the frame and which serve to urge the adjacent ends of the arms together, adjustable stops provided one on each support member and which serve to limit the pivotal movement of the arms under the effect of the tensioning means, and means for moving the support members and said arms away from the onion carrying notches.

3. Apparatus as claimed in claim 2 further comprising two adjupstable L-shaped stops, secured to the frame, said stops serving to limit the movement of each support member towards the onion carrier.

4. Apparatus as claimed in claim 2 wherein said support members are of L-shape, each having a laterally extending limb and an upright limb, said arms being attached to the free ends of the upright limbs, and a spindle secured to the free end of each laterally extending member.

5. Apparatus as claimed in claim 4 wherein said means for moving said support members includes a cam attached to each support member and a plurality of studs provided on the onion carrier.

References Cited

UNITED STATES PATENTS

| 1,992,995 | 3/1935 | Denner et al. | 146—43 |
| 2,602,480 | 7/1952 | Taylor | 146—83 X |
| 2,766,794 | 10/1956 | Odale | 146—43 X |
| 3,217,764 | 11/1965 | Gardner | 146—32 |

W. GRAYDON ABERCROMBIE, Primary Examiner

U.S. Cl. X.R.

146—166